United States Patent
Machida et al.

(10) Patent No.: US 10,513,098 B2
(45) Date of Patent: Dec. 24, 2019

(54) LAMINATED FILM

(71) Applicant: Toray Advanced Film Co., Ltd., Tokyo (JP)

(72) Inventors: Tetsuya Machida, Takatsuki (JP); Natsuki Nakamichi, Takatsuki (JP); Norihide Inoue, Takatsuki (JP); Naoko Tamura, Otsu (JP); Ryosuke Matsui, Otsu (JP); Masatoshi Ohkura, Otsu (JP)

(73) Assignee: Toray Advanced Film Co., Ltd., Tokyo (JP)

( * ) Notice: Subject to any disclaimer, the term of this patent is extended or adjusted under 35 U.S.C. 154(b) by 0 days.

(21) Appl. No.: 16/081,262

(22) PCT Filed: Feb. 27, 2017

(86) PCT No.: PCT/JP2017/007423
§ 371 (c)(1),
(2) Date: Aug. 30, 2018

(87) PCT Pub. No.: WO2017/150430
PCT Pub. Date: Sep. 8, 2017

(65) Prior Publication Data
US 2019/0070833 A1 Mar. 7, 2019

(30) Foreign Application Priority Data

Mar. 3, 2016 (JP) .................. 2016-040821
Nov. 30, 2016 (JP) .................. 2016-232252

(51) Int. Cl.
*B32B 27/08* (2006.01)
*C09J 125/08* (2006.01)
*C09J 7/24* (2018.01)
*B32B 7/12* (2006.01)
*B32B 27/30* (2006.01)
*B32B 27/32* (2006.01)

(52) U.S. Cl.
CPC ............... *B32B 27/08* (2013.01); *B32B 7/12* (2013.01); *B32B 27/302* (2013.01); *B32B 27/32* (2013.01); *C09J 7/243* (2018.01); *C09J 125/08* (2013.01); *B32B 2307/538* (2013.01); *B32B 2551/00* (2013.01); *B32B 2571/00* (2013.01)

(58) Field of Classification Search
CPC .............. B32B 27/08; C09J 7/243; C09J 7/30
See application file for complete search history.

(56) References Cited

FOREIGN PATENT DOCUMENTS

| | | |
|---|---|---|
| JP | 2002-155249 A | 5/2002 |
| JP | 2005-298630 A | 10/2005 |
| JP | 2006-335000 A | 12/2006 |
| JP | 2011-016354 A | 1/2011 |
| JP | 2011-057992 A | 3/2011 |
| JP | 2012-077244 A | 4/2012 |
| JP | 2012-111793 A | 6/2012 |
| JP | 2013-018242 A | 1/2013 |
| JP | 2014-148638 A | 8/2014 |
| WO | 2010/029773 A1 | 3/2010 |

*Primary Examiner* — Victor S Chang
(74) *Attorney, Agent, or Firm* — DLA Piper LLP (US)

(57) ABSTRACT

A protective film is capable of protecting and preserving an optical sheet surface, particularly the back surface of a prism sheet, independent of the shape and composition thereof in a range of adhesive forces appropriate for various adherends. A layered film having an adhesive layer having a styrene-based elastomer as the main component thereof on at least one surface of a base material layer, the layered film characterized in that the loss tangent tan δ and the shear storage modulus G' of the elastomer at 1 Hz in a temperature range of 30-60° C. are within specific ranges.

20 Claims, No Drawings

LAMINATED FILM

TECHNICAL FIELD

This disclosure relates to a laminated film having an adhesive layer containing a styrene based elastomer as primary component spread over at least one surface of a base layer, particularly, a laminated film capable of protecting and storing various optical prism sheets in an appropriate adhesive strength range, regardless of the back surface shape and composition of the adherend bodies.

BACKGROUND

Products made of various materials such as synthetic resin, metal, and glass and the like are often provided with surface protection materials to cover them to prevent them from being scratched or stained during processing, transportation, or storage. Among other surface protection materials, the protective film is used most widely and, in general, it is in the form of a laminated film containing a support base and an adhesive layer formed thereon. The adhesive layer is combined with an adherend so that the support base acts as a cover to protect its surface.

In recent years, liquid crystal displays and touch panel devices have been widespread, and they are composed of many members such as various optical sheets made of synthetic resins. Such optical sheets have to be highly resistant to defects such as optical distortion and, accordingly, laminated films are frequently used as protective films to prevent scratches and stains that may lead to such defects.

Those laminated films used as protective films should meet various requirements. For example, they should be unable to be removed easily from the adherends when they are exposed to changes in temperature, humidity, or their environmental factors or receive small stresses, and they should not leave part of the adhesive or adhesive components on the adherends when removed therefrom.

Of the above optical sheets, members with surface irregularities such as diffusion plates, prism sheets, and variously shaped diffusion faces formed on the back of prism sheets sometimes fail to develop a required strength of adhesion to a laminated film immediately after being combined together, leading to removal therefrom, because the adhesive layer cannot move flexibly in conformity to the irregularities. Known solutions to this problem include the use of a softened adhesive layer and the use of a tackifier to increase the adhesive strength (for example, Japanese Unexamined Patent Publication (Kokai) Nos. 2005-298630, 2012-77244 and 2012-111793).

For an adherend having soft irregular portions, however, it is sometimes impossible to obtain a required contact area, leading to an insufficient adhesive strength, only by adjusting the softness of the adhesive layer as proposed in JP '630 or JP '244. If an adequate contact area is realized by extremely softening the adhesive layer, the contact area tends to increase over time to cause an excessive increase in the adhesive strength, often resulting in difficulty in its removal or a significant amount of the adhesive being left on the adherend after its removal.

JP '793 proposes a method to control the adhesive strength by adjusting the content of the tackifier in the adhesive layer. The addition of a tackifier in large amounts can allow an adequate adhesive strength to develop even when the contact area is small immediately after combining the surfaces. However, the tackifier tends to bleed out of the surface of the adhesive layer over time or during storage under high-temperature, high-pressure conditions, leading to contamination of the adherend or difficulty in removal from the adherend due to an increase in adhesive strength.

Japanese Unexamined Patent Publication (Kokai) No. 2006-335000 proposes a laminated film designed to protect the prism face of an optical prism sheet. That proposal, however, focuses only on the shear storage modulus of the adhesive layer and, accordingly, fails to realize a suitable adhesive strength stably for various adherends with different adherend shapes or surface characteristics, sometimes leading to problems such as an excessive increase and variation over time in the adhesive strength to the back faces of various optical prism sheets with different surface forms.

WO 2010/029773 and Japanese Unexamined Patent Publication (Kokai) No. 2011-16354 also propose laminated films designed to protect the prism faces of optical prism sheets. Those proposals deal with characteristics control by controlling the block structure of the block copolymer used, and focuses also on the loss factor (tan δ) peak temperature range of adhesive layers and their shear storage modulus at 70° C. However, optical prism sheets vary in back face shape and characteristics and it is difficult for a protective film having good characteristics in a particular temperature range to serve widely for a variety of adherends. Furthermore, the proposed adhesive layers are too high in adhesive strength to serve for the back faces of prism sheets.

It could therefore be helpful to provide a laminated film that serves for protection and storage of adherends in a suitable range of adhesive strength, such adherends including surfaces of various optical sheets such as back faces of prism sheets that vary in shape and composition.

SUMMARY

We thus provide:

(1) A laminated film including a base layer and an adhesive layer located at least on one side thereof, the adhesive layer containing a styrene based elastomer as primary component, and the styrene based elastomer meeting equations (1) and (2) given below where G' and tan δ representing the shear storage modulus and loss factor thereof at 1 Hz and at 30° C. to 60° C.:

$$0.8 \times 10^6 \leq G' \text{ (Pa)} \leq 1.8 \times 10^6 \quad (1)$$

$$0.05 \leq \tan \delta \leq 0.10 \quad (2).$$

(2) A laminated film as set forth in item (1), wherein the styrene based elastomer meets equation (3) given below where G" represents the shear loss modulus at 1 Hz at 30° C. to 60° C.:

$$0.08 \times 10^6 \leq G'' \text{ (Pa)} \leq 0.13 \times 10^6 \quad (3).$$

(3) A laminated film as set forth in either item (1) or (2), wherein the base layer contains a polyolefin resin.

(4) A laminated film as set forth in any one of items (1) to (3), wherein aliphatic amide accounts for 0.01 to 10 mass % of the adhesive layer.

(5) A laminated film as set forth in any one of items (1) to (4), wherein the styrene based elastomer has a styrene content of 30 mass % or more and 60 mass % or less.

(6) A laminated film as set forth in any one of items (1) to (5), wherein the styrene based elastomer has a styrene content of 50 mass % or more and 60 mass % or less.

(7) A laminated film as set forth in any one of items (1) to (6), wherein the adhesive layer in the laminated film has an average surface roughness Ra of 0.10 to 1.00 μm.

(8) A laminated film as set forth in any one of items (1) to (7) designed for protection of the back face of a prism sheet.
(9) A laminated film as set forth in item (8), wherein the back face of a prism sheet contains an ester based resin or an acrylic based resin.
(10) A laminated film as set forth in either item (8) or (9), wherein the back face of a prism sheet has an average surface roughness Ra of 0.01 to 1 µm.

We provide a laminated film capable of protecting and storing various optical prism sheets in an appropriate range of adhesive strength, regardless of the back face shape and composition of the adherend bodies.

DETAILED DESCRIPTION

The laminated film is preferably in the form of a laminated film having a substrate layer and an adhesive layer spread over at least one surface thereof, the adhesive layer containing a styrene elastomer as main component. Good examples of the styrene based elastomer include styrene-conjugated diene based copolymers such as styrene-butadiene copolymer (SBR), styrene-isoprene-styrene copolymer (SIS), and styrene-butadiene-styrene copolymer (SBS); hydrogenated products thereof (such as hydrogenated styrene-butadiene copolymer (HSBR) and styrene-ethylene-butylene-styrene copolymer (SEBS)); and others such as styrene-isobutylene based copolymers (such as styrene-isobutylene-styrene triblock copolymer (SIBS) and styrene-isobutylene diblock copolymer (SIB), and mixtures thereof). Of these, preferred ones include hydrogenated styrene-butadiene copolymer (HSBR), styrene-ethylene-butyl ene-styrene copolymer (SEBS), styrene-isobutylene based copolymer. The primary component of an adhesive layer accounts for 50 mass % or more of the adhesive layer, more preferably it accounts for 70 mass % or more thereof. The styrene based elastomers listed above may be used as a mixture of a plurality thereof and, in that case, the mixture as a whole should account for 50 mass % or more of the adhesive layer.

The styrene based elastomer preferably has a weight average molecular weight of 50,000 to 400,000. It is more preferably 50,000 to 200,000. The weight average molecular weight range is preferred from the viewpoint of ensuring both a cohesive strength required for an adhesive layer and a processability required for film production.

The styrene based elastomer is preferably a block copolymer composed mainly of a hard segment containing a styrene component and a soft segment containing an olefin component, and regarding the copolymerization ratio between the hard segment and the soft segment, the styrene phase preferably accounts for 30 to 60 mass %, more preferably 40 to 60 mass %, and still more preferably 50 to 60 mass %. It is preferable, furthermore, that not only the hard segment, but also the soft segment is a copolymer containing 0.1 to 30 mass % of a styrene monomer. Incorporation of a styrene component in the soft segment can control the initial adhesive strength and adhesion increase behavior.

For the styrene based elastomer in the adhesive layer of the laminated film, the shear storage modulus G' (hereinafter occasionally referred to simply as G') and loss factor (tan δ) measured at 1 Hz at 30° C. to 60° C. preferably meet equations (1) and (2), respectively, because this allows the protection of the optical prism sheets and, in particular, the adhesion to and removal from the back faces of the optical prism sheets, which may widely vary in composition and structure, to be controlled in an preferred adhesive strength range:

$$0.8 \times 10^6 \leq G' \text{ (Pa)} \leq 1.8 \times 10^6 \quad (1)$$

$$0.05 \leq \tan \delta \leq 0.10 \quad (2).$$

The expression "the shear storage modulus G' meets equation (1) at 30° C. to 60° C." means that both the maximum value and the minimum value of the shear storage modulus G' in the range of 30° C. to 60° C. meet equation (1). The expression "the loss factor (tan δ) meets equation (2) at 30° C. to 60° C." means that both the maximum value and the minimum value of the loss factor (tan δ) at 30° C. to 60° C. meet equation (2).

If the shear storage modulus G' is less than $0.8 \times 10^6$ Pa, the adhesive layer will be too soft and too adhesive, possibly making the removal of the adherend difficult depending on its properties. If G' is more than $1.8 \times 10^6$ Pa, on the other hand, the adherend, depending on its properties, may fail to develop a required adhesive strength, and the laminated film will float on the adherend surface. The shear storage modulus G' is more preferably $0.8 \times 10^6$ to $1.6 \times 10^6$ Pa, sill more preferably $0.8 \times 10^6$ to $1.5 \times 10^6$ Pa, and particularly preferably $0.8 \times 10^6$ to $1.3 \times 10^6$ Pa.

If the loss factor (tan δ) is less than 0.05, the adherend, depending on its properties, may be too low in adhesive strength, possibly leading to delamination. If the loss factor (tan δ) is more than 0.10, on the other hand, the adherend, depending on its properties, may be too high in initial adhesive strength. The loss factor (tan δ) is more preferably 0.06 to 0.10.

For the styrene based elastomer in the adhesive layer of the laminated film, the shear loss modulus G" (hereinafter occasionally referred to simply as G") measured at 1 Hz at 30° C. to 60° C. preferably meets equation (3) to realize a reduction in its dependence on the adherend and a reduction in the change in the adhesive strength after aging:

$$0.08 \times 10^6 \leq G'' \text{ (Pa)} \leq 0.13 \times 10^6 \quad (3).$$

The expression "the shear loss modulus G" meets equation (3) at 30° C. to 60° C." means that both the maximum value and the minimum value of the shear loss modulus G" at 30° C. to 60° C. meet equation (3).

If G" is less than $0.08 \times 10^6$ Pa, good adhesion to the adherend will not be realized, possibly leading to immediate removal. If G" is more than $0.13 \times 10^6$ Pa, on the other hand, a significant degree of dependence on the adherend or changes in the adhesive strength after aging may occur. G" is more preferably $0.09 \times 10^6$ to $0.12 \times 10^6$ Pa.

Good methods to control the shear storage modulus G', shear loss modulus G," and loss factor (tan δ) of the styrene based elastomer used as the primary component of the adhesive layer in preferred ranges include controlling the block lengths and ratio of the hard segment of a styrene component and the soft segment of an olefin component in the styrene based elastomer as well as the quantity of the styrene component in the soft segment, and using a mixture of a plurality of styrene based elastomers having different viscoelastic characteristics.

The shear storage modulus G' and the shear loss modulus G" of the styrene based elastomer used as the primary component of the adhesive layer can be calculated according to the method described under EXAMPLES.

The adhesive layer of the laminated film may also contain a tackifier, antiblocking agent, antioxidant, softening agent and the like, in addition to the aforementioned styrene based elastomer.

Good examples of the tackifier for use in the adhesive layer include petroleum resins such as aliphatic based copolymers, aromatic based copolymers, aliphatic-aromatic based copolymers, and alicyclic copolymers; rosin based resins such as coumarone-indene based resins, terpene based resins, terpene phenolic resins, and polymerized rosin; and modified resins such as phenolic resins, xylene based resins, and hydrogenated products thereof. Furthermore, a plurality of these tackifiers may be used in combination. These tackifiers preferably account for 0.01 to 20 mass % of the adhesive layer from the viewpoint of controlling the adhesive characteristics, but more preferably 0.1 to 10 mass % from the viewpoint of eliminating adhesive residues.

The antiblocking agent used in the adhesive layer attaches to the surfaces of chips of the styrene based elastomer to prevent adhesion or blocking between the chips and examples include, for example, metal salts of saturated fatty acids such as calcium stearate and magnesium behenate; and fatty acid amide compounds including saturated fatty aliphatic bisamides (such as ethylene bisstearate amide and hexamethylene-bis-stearate amide) and saturated fatty aromatic bisamides. In particular, it is desirable for a fatty acid amide compound to account for 0.01 to 10 mass % of the adhesive layer entire, which accounts for 100 mass %, from the viewpoint of the control of adhesive strength and reduction of changes in the adhesive strength after aging. Such a fatty acid amide compound more preferably accounts for 0.1 to 5 mass %, particularly preferably 0.2 to 3 mass %. In some cases, it is difficult to add an antiblocking agent up to more than 0.5 mass % by attaching it commonly to the chip surface with the aim of the prevention of blocking, and accordingly it is preferred to melt and knead a required quantity of the antiblocking agent with the styrene based elastomer.

Preferred examples of the antioxidant used in the adhesive layer include phenolic and phosphoric antioxidants, and pentaerythrityl-tetrakis[3-(3,5-t-butyl-4-hydroxyphenyl) propionate] (trade name IRGANOX1010 (manufactured by BASF)) and tris-(2,4-di-t-butyl phenyl) phosphite (trade name IRGAFOS168 (manufactured by BASF)), which are commonly used for polyolefin resins, can serve appropriately.

It is preferable for the adhesive layer to have an average surface roughness Ra of 0.10 to 1.00 μm because this allows the protection of optical prism sheets and, in particular, the adhesion to and removal from the back faces of optical prism sheets, which may widely vary in composition and structure, to be controlled in an preferred adhesive strength range.

An average surface roughness Ra of less than 0.10 μm can lead to an increased dependence on the adherend or increased changes in adhesive strength over time. An Ra of more than 1.00 μm, on the other hand, can lead to difficulty in making contact with the adherend and it will be impossible to ensure a required adhesive strength. The average surface roughness is preferably 0.20 to 0.80 μm, particularly preferably 0.30 to 0.70 μm.

Good methods of controlling the average surface roughness Ra include a method in which a material that can form a rough surface is used in the base layer to allow the irregularities in the base layer to be reflected in the adhesive layer located on top thereof, a method in which the irregular shape of the surface of the base layer other than the surface carrying the adhesive layer is transferred to the adhesive layer, a method in which an irregular surfaced layer is formed on the surface of the base layer other than the surface carrying the adhesive layer, followed by transferring the irregular shape to the adhesive layer, and a method in which a material that can form a rough surface is used in the adhesive layer.

It is preferable that the laminated film to have a tensile modulus of 200 to 10,000 MPa. If the tensile modulus is less than 200 MPa, the laminated film will be easily deformed, possibly leading to creasing and breakage. If the tensile modulus is more than 10,000 MPa, on the other hand, the film will be too hard to conform to the adherend, possibly failing to realize a required adhesive strength. The laminated film has a base layer that carries an adhesive layer at least on one surface thereof, and the base layer preferably contains a polyolefin resin. There are no specific limitations on the polyolefin resin to be contained in the base layer, but good examples include high density polyethylene, medium density polyethylene, low density polyethylene, isotactic polypropylene, atactic polypropylene, propylene-ethylene copolymer (random copolymer and/or block copolymer), propylene-α-olefin copolymer, propylene-ethyl-ene-α-olefin copolymer, ethylene-ethyl (meth)acrylate copolymer, ethylene-methyl (meth)acrylate copolymer, ethylene-n-butyl (meth)acrylate copolymer, ethylene-vinyl acetate copolymer, polybutene-1, and poly4-methyl pentene-1. A mixture of a plurality of different polyolefin resins may be used to form a base layer. There are no specific limitations on the type of the α-olefin as long as it can be copolymerized with propylene or ethylene, and good examples include, for example, 1-butene, 1-hexene, 4-methyl-1-pentene, 1-octene, 1-pentene, and 1-heptene.

Of the various polyolefins listed above, propylene based materials such as isotactic polypropylene, propylene-ethylene copolymer (random copolymer and/or block copolymer), propylene-ethylene-α-olefin copolymer, and propylene-α-olefin copolymer are more preferable because they have high rigidity and also because they provide an adhesive layer having an average surface roughness Ra controlled in a preferable range.

In addition, the base layer may also contain an antioxidant, antiblocking agent or the like, and the base layer may carry a release layer on the surface other than the one carrying the adhesive layer. A lubricant such as fluororesin and inorganic particles may be added as a release agent to the polyolefin resin used in the release layer in the base layer so that this layer comes in contact with the adhesive layer when a film roll is wound up, and serves to adjust the expanding force in the subsequent rewinding step.

Some components of the adhesive layer, including the styrene based elastomer used to form the adhesive layer, exist in small amounts in the base layer of the laminated film, which is preferable because they improve the affinity between the adhesive layer and the base layer and increase the adhesive strength at the interface between the adhesive layer and the base layer. As a method to prepare a base layer containing adhesive layer components, the adoption of the steps of recovering the laminated film, using it as recycled material, and re-adding this recovered material is preferable from the viewpoint of the recycling of resins and reduction in production costs.

The adhesive layer of the laminated film preferably has a thickness of 1 to 10 μm. It is more preferably 2 to 8 μm. If the adhesive layer is less than 1 the adhesive strength will be too small, possibly leading to a failure in providing protection. If the adhesive layer has a thickness of more than 10 μm, on the other hand, the adhesive strength will be too high, possibly leading to difficulty in removal.

The base layer of the laminated film preferably has a thickness of 20 to 100 μm, more preferably 25 to 80 μm. It is particularly preferably 30 to 60 µm from the viewpoint of ensuring both a high scratch resistance and a high storage efficiency during storage of protected adherends.

Described below is a typical method of producing the laminated film. However, production of the laminated film is not limited to this description.

If a styrene-ethylene-butylene-styrene block copolymer (SEBS) is to be adopted as the styrene based elastomer to work as the primary component of the adhesive layer, it may be effective to use a mixture of elastomers selected appropriately from such commercial products as Kraton G Polymer, Dynalon, Tuftec and the like, manufactured by Kraton Polymer, JSR Corporation, Asahi Kasei Chemicals Corporation and the like so that the mixture can meet required viscoelasticity characteristics. Another good method is to prepare a SEBS copolymer with specially adjusted viscoelasticity characteristics according to elastomer polymerization methods as described in, for example, Japanese Unexamined Patent Publication (Kokai) No. 2014-148638 and Japanese Unexamined Patent Publication (Kokai) No. 2011-57992.

A mixture of 88 parts by mass of a styrene based elastomer used as a component to form an adhesive layer, 2 parts by mass of an ethylene bisstearate amide as antiblocking agent, 5 parts by mass of FTR6125 manufactured by Mitsui Chemicals, Inc. and 5 parts by mass of Arkon P100 manufactured by Arakawa Chemical Industries, Ltd. as tackifiers is supplied to a melt-extruder. A polypropylene resin is also supplied as a base layer component to the melt-extruder. A release layer may be formed on the surface of the base layer other than the one where an adhesive layer is to be formed.

The adhesive layer components and the base layer components are extruded separately from a melt-extruder. In this step, it is preferable for the resin components of the adhesive layer to be controlled at a temperature of 190° C. to 240° C. If the resin temperature is less than 190° C., the melt viscosity will be so high that the resin kneading will not be carried out sufficiently, possibly leading to uneven film characteristics. If the resin temperature is more than 240° C., on the other hand, the elastomer will suffer heat degradation and adhesive residues will often be left after the adhesive removal step. The resin temperature is preferably 200° C. to 230° C. Then, the adhesive layer and the base layer are combined in the T-die to form a layered structure and co-extruded. It is then cooled for solidification on a metal cooling roll, molded into a film-like shape, and wound up into a roll to provide a laminated film.

Subsequently, the intermediate material wound up in a roll is slit in the next step to the width of the intended optical sheet to be protected. It is preferable to leave the film at room temperature for 24 to 36 hours before the slitting step to release the residual strain in the film and stabilize the film characteristics.

If the laminated film is to be used as protective film, the adherends to be protected by the laminated film are preferably the back faces of optical prism sheets in liquid crystal displays, touch panel devices and the like. To produce an optical prism sheet, a biaxially orientated polyester film, for example, is prepared as base material and a UV curable resin is spread over the surface of the base material to develop various optical characteristics, followed by curing it by UV light while molding it in prism-like protrusions to form a sheet having an optically functional surface. In some optical prism sheets, such a back face has a light diffusion function to allow integration of optical sheet functions.

When the laminated film is used as a protective film, the laminated film can work effectively to protect the surfaces of optical prism sheets and, in particular, this laminated film is suitable for the protection of the back faces of prism sheets. It can work particularly effectively, furthermore, for the protection of prism sheets' back faces made of an ester based resin or an acrylic based resin. The expression "prism sheets' back faces made of ester based resin or acrylic based resin" means that the back faces of the prism sheet contain an ester based resin or an acrylic based resin. Components of such back faces can be determined by the FT-IR ATR technique.

To produce a back face made of an ester based resin on an optical prism sheet, for example, a layer of a polyester resin that contains preferably 0.01 to 10 mass %, more preferably 0.1 to 5 mass %, inorganic particles or organic particles with an average particle diameter of preferably 0.1 to 20 µm, more preferably 1 to 10 µm, is formed over the surface other than the one where prisms will be formed in a post-processing step, followed by melting, film production, and biaxial stretching. In the process of producing a biaxially orientated polyester film to serve as the base material for a prism sheet, a functional layer may be formed by a so-called in-line coating step in which an aqueous solution containing dispersed polyester resin and dispersed transparent bead particles is spread over the surface other than the one where prisms will be formed, followed by stretching at least uniaxially and heat treatment for solidification.

To prepare a prism sheet having a back face of an acrylic based resin, furthermore, an acrylic resin is applied, as described above, for example, over the surface opposite to the prism face by die coating or the like, followed by curing by UV light while molding a light diffusion layer.

The back face of the above prism sheet preferably has an adherend surface wet tension (surface free energy) of 25 mN/m or more. If the surface wet tension is less than 25 mN/m, it will be difficult in some cases to bring the surface into firm contact with the laminated film. The upper limit is practically about 60 mN/m. The adherend surface wet tension can be controlled by selecting an appropriate adherend material and production method.

The back face of an optical prism sheet to be protected by the laminated film preferably has an average surface roughness Ra of 0.01 to 1 µm to control the adhesive strength in a suitable range. It is more preferably 0.05 to 0.8 µm. Furthermore, its ten-point average roughness Rz is preferably less than the thickness of the adhesive layer. If Rz is more than the thickness of the adhesive layer, the adhesive layer will not come in contact at all with the adherend even when the protrusions entirely enter into the adhesive layer, making it difficult to realize an appropriate adhesive strength.

EXAMPLES

Our films and methods are described in more detail below with reference to Examples. The methods used to determine and evaluate various characteristics are as follows.
(1) Viscoelasticity (Shear Storage Modulus, Shear Loss Modulus, Loss Factor)

The styrene based elastomer used in Examples and Comparative examples was melt-molded into a sheet with a thickness of 2 mm, which was heated in an AR2000ex rheometer manufactured by TA Instruments at a heating rate of 3° C./min over the temperature range from minus 50° C. to plus 150° C. while subjecting it to dynamic shear deformation at a frequency of 1 Hz and a strain of 0.01% to measure the shear storage modulus G' and shear loss modulus G" at intervals of 20 seconds. Then, the loss factor (tan δ) (=G"/G') was calculated from the G' and G" measurements. When two or more styrene based elastomer components were used, the styrene based elastomer components were mixed at a predetermined mixing ratio, kneaded in Labo Plastomill 100MR3 manufactured by Toyo Seiki Seisaku-sho, Ltd. for 10 minutes at a temperature of 200° C. and a rotating speed of 20 rpm, and melt-molded into a sheet with a thickness of 2 mm, which was examined as described above to provide calculations.

(2) Initial Adhesive Strength

A laminated film sample heat- and humidity-conditioned for 24 hours at a temperature of a 23° C. and a relative humidity of 50% was laminated with a prism sheet back face of an adherend material as given in Table 1 in a roll press mill (special type pressure-bonding roller, manufactured by Yasuda Seiki Seisakusho, Ltd. (hardness A80, dead weight 2 kg)) at a laminating pressure of 0.35 MPa and a laminating speed of 3 m/min. Then, they were stored for 24 hours at a temperature of 23° C. and a relative humidity of 50% and evaluated for adhesive strength.

For the adhesive strength evaluation, a tensile tester (Tensilon universal tester, manufactured by Orientec Co., Ltd.) was used and the adhesive strength was measured at a peeling speed of 300 mm/min and a peeling angle of 180°. Five measurements were taken and their average was adopted as the initial adhesive strength.

(3) Adhesive Strength after Aging

A laminated film sample heat- and humidity-conditioned for 24 hours at a temperature of a 23° C. and a relative humidity of 50% was laminated with a prism sheet back face of an adherend material as given in Table 1 in a roll press mill (special type pressure-bonding roller, manufactured by Yasuda Seiki Seisakusho, Ltd. (hardness A80, dead weight 2 kg)) at a laminating pressure of 0.35 MPa and a laminating speed of 3 m/min. Then, they were stored for 72 hours in a hot air oven controlled at a temperature of 60° C. and additionally stored for 24 hours at a temperature of 23° C. and a relative humidity of 50%, followed by evaluation for adhesive strength.

For the adhesive strength evaluation, a tensile tester (Tensilon universal tester, manufactured by Orientec Co., Ltd.) was used and the adhesive strength measured at a peeling speed of 300 mm/min and a peeling angle of 180°. Three measurements were taken and their average adopted as the adhesive strength after aging.

(4) Surface Roughness

For the average surface roughness Ra of the adhesive layer of a laminated film, average surface roughness Ra of the back face of a prism sheet, and its ten-point average roughness Rz, a high accuracy fine shape measuring device (Surfcorder ET4000A, manufactured by Kosaka Laboratory Ltd.) was used according to JIS B0601-1994 to take 21 measurements at 2 mm intervals in the transverse direction and at 10 μm intervals in the length direction (machine direction) of the film, followed by carrying out three dimensional analysis to determine the average surface roughness (Ra) and ten-point average roughness (Rz) and making evaluations. The measuring conditions included the use of a diamond needle with a stylus tip radius of 2.0 μm, a measuring force of 100 μN, and a cut-off of 0.8 mm.

(5) Adherend Material

Using Frontier FT-IR equipped with a UATR IR unit manufactured by Perkin-Elmer, spectral analysis of the back face of a prism sheet was performed by the attenuation total reflection (ATR) technique using diamond/ZnSe as medium crystal to examine the material of the back face. The spectroscope had a resolution of 1 cm$^{-1}$, and spectral measurements were taken 4 times.

(6) Surface Wet Tension of Adherend

Using a contact angle gauge (model CA-D, manufactured by Kyowa Interface Science Co., Ltd.), the static contact angle of four liquids (water, ethylene glycol, formamide, and methylene iodide) to the back face of a prism sheet was measured. From the measured contact angle of each liquid and the surface tension of the measuring liquid, $\gamma^L$, $\gamma^+$, and $\gamma^-$ were calculated by substituting them into the equations given below and the surface wet tension (surface free energy) γ was determined:

$$(\gamma^L\gamma_j^L)^{1/2}+2(\gamma^+\gamma_j^-)^{1/2}+2(\gamma_j^+\gamma^-)^{1/2}=(1+\cos\theta)[\gamma_j^L+2(\gamma_j^+\gamma_j^+)^{1/2}]/2$$

And $\gamma=\gamma^L+2(\gamma^+\gamma^-)^{1/2}\gamma_j=\gamma_j^L+2(\gamma_j^+\gamma_j^-)^{1/2}$.

γ, $\gamma^L$, $\gamma^+$, and $\gamma^-$ denote the surface wet tension (surface free energy), long-range force term, Lewis acid parameter, and Lewis base parameter, respectively, of the film surface and $\gamma_j$, $\gamma_j^L$, $\gamma_j^+$, $\gamma_j^-$; denote the surface wet tension (surface free energy), long-range force term, Lewis acid parameter, and Lewis base parameter, respectively, of the measuring liquid used. For the surface tension of each liquid used here, the values proposed by Oss (Fundamentals of Adhesion, L. H. Lee (Ed.), p. 153, Plenum ess, New York (1991)), which are given in Table 1, were used.

Example 1

Elastomer S1606 (styrene 50 mass %) manufactured by Asahi Kasei Chemicals Corporation was adopted as the styrene based elastomer component, and 90 parts by mass of it was dry-blended with 5 parts by mass of FTR6125 manufactured by Mitsui Chemicals, Inc. and 5 parts by mass of Arkon P100 manufactured by Arakawa Chemical Industries, Ltd. to prepare an adhesive layer resin composition.

To form the base layer, a commercial product of isotactic polypropylene (homopolypropylene) with a melt flow rate (MFR, 230° C., 2.16 kg) of 4 g/10 minutes was used.

The adhesive layer resin composition and the base layer resin were fed to a two-component double-layer T-die type film production machine equipped with two single screw extruders with a compression ratio of 4.2 and an L/D ratio of 25, cast to come in contact with metal cooling rolls controlled so that the adhesive layer-side surface had a temperature of 30° C., and cooled for solidification to form a film, thereby providing a laminated film with an adhesive layer thickness of 5 μm, a base layer thickness of 35 μm, and an overall thickness of 40 μm.

Example 2

Except that the adhesive layer components used in Example 1 were replaced with those given below, a film with an overall thickness of 40 μm was obtained in the same way as in Example 1:
Elastomer S1606 (styrene 50 mass %), manufactured by Asahi Kasei Chemicals Corporation: 80 parts by mass
Tuftec H1052 (styrene 20 mass %), manufactured by Asahi Kasei Chemicals Corporation: 10 parts by mass
FTR6125, manufactured by Mitsui Chemicals, Inc.: 5 parts by mass
Arkon P100, manufactured by Arakawa Chemical Industries, Ltd.: 5 parts by mass.

Example 3

Except that the adhesive layer components used in Example 1 were replaced with those given below, a film with an overall thickness of 40 µm was prepared in the same way as in Example 1:
Elastomer S1606, manufactured by Asahi Kasei Chemicals Corporation: 70 parts by mass
Tuftec H1052, manufactured by Asahi Kasei Chemicals Corporation: 20 parts by mass
FTR6125, manufactured by Mitsui Chemicals, Inc.: 5 parts by mass
Arkon P100, manufactured by Arakawa Chemical Industries, Ltd.: 5 parts by mass.

Comparative Example 1

Except that the adhesive layer components used in Example 1 were replaced with those given below, a film with an overall thickness of 40 µm was prepared in the same way as in Example 1:
Tuftec H1052, manufactured by Asahi Kasei Chemicals Corporation: 90 parts by mass
FTR6125, manufactured by Mitsui Chemicals, Inc.: 5 parts by mass
Arkon P100, manufactured by Arakawa Chemical Industries, Ltd.: 5 parts by mass.

Comparative Example 2

Except that the adhesive layer components used in Example 1 were replaced with those given below, a film with an overall thickness of 40 µm was prepared in the same way as in Example 1:
Dynalon 8300P (styrene 9 mass %), manufactured by JSR Corporation: 90 parts by mass
FTR6125, manufactured by Mitsui Chemicals, Inc.: 5 parts by mass
Arkon P100, manufactured by Arakawa Chemical Industries, Ltd.: 5 parts by mass.

Example 4

Except that the adhesive layer components used in Example 1 were replaced with those given below, a film with an overall thickness of 40 µm was prepared in the same way as in Example 1:
Elastomer S1606, manufactured by Asahi Kasei Chemicals Corporation: 89.1 parts by mass Ethylene bisstearate amide (fatty acid amide compound): 0.9 part by mass
FTR6125, manufactured by Mitsui Chemicals, Inc.: 5 parts by mass
Arkon P100, manufactured by Arakawa Chemical Industries, Ltd.: 5 parts by mass.

Example 5

Except that the adhesive layer components used in Example 1 were replaced with those given below, a film with an overall thickness of 40 µm was prepared in the same way as in Example 1:
Elastomer S1606, manufactured by Asahi Kasei Chemicals Corporation: 88.2 parts by mass
Erucic acid amide (fatty acid amide compound): 1.8 parts by mass
FTR6125, manufactured by Mitsui Chemicals, Inc.: 5 parts by mass
Arkon P100, manufactured by Arakawa Chemical Industries, Ltd.: 5 parts by mass.

Example 6

Except that the base layer material used in Example 4 was replaced with a propylene-ethylene block copolymer (block polypropylene) with a MFR (230° C., 2.16 kg) of 8 g/10 minutes and an ethylene content of 10 mass %, a film with an overall thickness of 40 µm was prepared in the same way as in Example 4.

Comparative Example 3

Except that the adhesive layer components used in Example 1 were replaced with those given below, a film with an overall thickness of 40 µm was prepared in the same way as in Example 1:
Tuftec H1052, manufactured by Asahi Kasei Chemicals Corporation: 89.1 parts by mass
Ethylene bisstearate amide: 0.9 part by mass
FTR6125, manufactured by Mitsui Chemicals, Inc.: 5 parts by mass
Arkon P100, manufactured by Arakawa Chemical Industries, Ltd.: 5 parts by mass.

TABLE 1

|  | Adherend A | Adherend B | Adherend C | Adherend D |
|---|---|---|---|---|
| Adherend material | acrylic | ester | acrylic | acrylic |
| Average surface roughness Ra (µm) | 0.2 | 0.1 | 0.3 | 0.1 |
| Ten-point average roughness Rz (µm) | 2.2 | 3.8 | 2.1 | 1.2 |
| Adherend surface wet tension (mN/m) | 50 | 42 | 36 | 48 |

TABLE 2

| | | Example 1 | Example 2 | Example 3 | Comparative Example 1 | Comparative Example 2 |
|---|---|---|---|---|---|---|
| Viscoelastic characteristics of styrene based elastomer in adhesive layer | Minimum of G' at 30° C. to 60° C. (×10$^6$ pa) | 1.42 | 1.40 | 1.40 | 1.33 | 0.53 |
| | Maximum of G' at 30° C. to 60° C. (×10$^6$ Pa) | 1.63 | 1.64 | 1.65 | 1.73 | 0.58 |
| | Equation (1) met or not | met | met | met | met | not met |
| | Minimum of tanδ at 30° C. to 60° C. | 0.06 | 0.07 | 0.07 | 0.08 | 0.09 |
| | Maximum of tanδ at 30° C. to 60° C. | 0.08 | 0.09 | 0.10 | 0.15 | 0.12 |
| | Equation (2) met or not | met | met | met | not met | not met |
| | Minimum of G'' at 30° C. to 60° C. (×10$^6$ Pa) | 0.098 | 0.103 | 0.109 | 0.130 | 0.052 |

TABLE 2-continued

|  | Example 1 | Example 2 | Example 3 | Comparative Example 1 | Comparative Example 2 |
|---|---|---|---|---|---|
| Maximum of G" at 30° C. to 60° C. (×10$^6$ Pa) | 0.114 | 0.124 | 0.141 | 0.205 | 0.060 |
| Equation (3) met or not | met | met | not met | not met | not met |
| Average surface roughness Ra (μm) of adhesive layer surface | 0.16 | 0.15 | 0.15 | 0.14 | 0.13 |

TABLE 3

|  |  | Example 1 | Example 2 | Example 3 | Comparative Example 1 | Comparative Example 2 |
|---|---|---|---|---|---|---|
| Initial adhesive strength (mN/25 mm) | Adherend A | 1 | 1 | 2 | 4 | 10 |
|  | Adherend B | 35 | 60 | 100 | 350 | 240 |
|  | Adherend C | 6 | 7 | 10 | 10 | 30 |
|  | Adherend D | 15 | 25 | 30 | 90 | 120 |
|  | Standard deviation | 13 | 23 | 39 | 141 | 91 |
| Adhesive strength over time 60° C., 72 hours (mN/25 mm) | Adherend A | 4 | 6 | 8 | 20 | 80 |
|  | Adherend B | 450 | 500 | 530 | 800 | 600 |
|  | Adherend C | 35 | 45 | 60 | 120 | 250 |
|  | Adherend D | 130 | 170 | 220 | 500 | 190 |
|  | Standard deviation | 177 | 194 | 204 | 311 | 195 |

TABLE 4

|  |  | Example 4 | Example 5 | Example 6 | Comparative Example 3 |
|---|---|---|---|---|---|
| Viscoelastic characteristics of styrene based elastomer in adhesive layer | Minimum of G' at 30° C. to 60° C. (×10$^6$ pa) | 1.41 | 1.42 | 1.41 | 1.33 |
|  | Maximum of G' at 30° C. to 60° C. (×10$^6$ Pa) | 1.62 | 1.63 | 1.62 | 1.73 |
|  | Equation (1) met or not | met | met | met | Met |
|  | Minimum of tanδ at 30° C. to 60° C. | 0.06 | 0.06 | 0.06 | 0.08 |
|  | Maximum of tanδ at 30° C. to 60° C. | 0.08 | 0.08 | 0.08 | 0.15 |
|  | Equation (2) met or not | met | met | met | not met |
|  | Minimum of G" at 30° C. to 60° C. (×10$^6$ Pa) | 0.098 | 0.099 | 0.098 | 0.130 |
|  | Maximum of G" at 30° C. to 60° C. (×10$^6$ Pa) | 0.115 | 0.115 | 0.115 | 0.205 |
|  | Equation (3) met or not | met | met | met | not met |
| Average surface roughness Ra (μm) of adhesive layer |  | 0.15 | 0.14 | 0.33 | 0.13 |

TABLE 5

|  |  | Example 4 | Example 5 | Example 6 | Comparative Example 3 |
|---|---|---|---|---|---|
| Initial adhesive strength (mN/25 mm) | Adherend A | 1 | 1 | 1 | 2 |
|  | Adherend B | 20 | 10 | 9 | 200 |
|  | Adherend C | 6 | 3 | 4 | 6 |
|  | Adherend D | 15 | 10 | 9 | 50 |
|  | Standard deviation | 7 | 4 | 3 | 80 |
| Adhesive strength over time 60° C., 72 hours (mN/25 mm) | Adherend A | 3 | 1 | 2 | 15 |
|  | Adherend B | 360 | 35 | 37 | 700 |
|  | Adherend C | 30 | 5 | 13 | 100 |
|  | Adherend D | 100 | 15 | 28 | 400 |
|  | Standard deviation | 141 | 13 | 13 | 270 |

In all Examples, a laminated film having a particularly small standard deviation in initial adhesive strength and a small adherend dependence was obtained. In Examples 5 and 6, where a fatty acid amide compound was adopted according to a preferred example, it was shown that the adherend dependence of the adhesive strength after aging was small. In Example 7, where the adhesive layer had an average surface roughness Ra in the particularly preferable range, the adherend dependence of the initial adhesive strength and the adherend dependence of the adhesive strength after aging were small. On the other hand, the adherend dependence of the initial adhesive strength was large in the Comparative Examples.

INDUSTRIAL APPLICABILITY

Regardless of the shape or component materials of the back faces of optical prism sheets, the laminated film can serve for protection and storage of various adherends in a suitable adhesive strength range, and its dependence on adherends is so small that it can be used suitably as protective film for optical sheets.

The invention claimed is:

1. A laminated film comprising a base layer and an adhesive layer located at least on one side thereof, the adhesive layer containing a styrene based elastomer as primary component, the styrene based elastomer meeting equations (1) and (2) where G' and tan δ representing the shear storage modulus and loss factor thereof at 1 Hz and at 30° C. to 60° C.:

$$0.8 \times 10^6 \leq G' \text{ (Pa)} \leq 1.8 \times 10^6 \quad (1)$$

$$0.05 \leq \tan \delta \leq 0.10 \quad (2).$$

2. The laminated film as set forth in claim 1, wherein the styrene based elastomer meets equation (3) where G" represents the shear loss modulus at 1 Hz at 30° C. to 60° C.:

$$0.08 \times 10^6 \leq G'' \text{ (Pa)} \leq 0.13 \times 10^6 \quad (3).$$

3. The laminated film as set forth in claim 1, wherein the base layer contains a polyolefin resin.

4. The laminated film as set forth in claim 1, wherein the adhesive layer comprises 0.01 to 10 mass % of aliphatic amide.

5. The laminated film as set forth in claim 1, wherein the styrene based elastomer has a styrene content of 30 mass % or more and 60 mass % or less.

6. The laminated film as set forth in claim 1, wherein the styrene based elastomer has a styrene content of 50 mass % or more and 60 mass % or less.

7. The laminated film as set forth in claim 1, wherein the adhesive layer in the laminated film has an average surface roughness Ra of 0.10 to 1.00 μm.

8. The laminated film as set forth in claim 1 that protects back face of a prism sheet.

9. The laminated film as set forth in claim 8, wherein the back face of a prism sheet contains an ester based resin or an acrylic based resin.

10. The laminated film as set forth in claim 8, wherein the back face of a prism sheet has an average surface roughness Ra of 0.01 to 1 μm.

11. The laminated film as set forth in claim 9, wherein the back face of a prism sheet has an average surface roughness Ra of 0.01 to 1 μm.

12. The laminated film as set forth in claim 2, wherein the base layer contains a polyolefin resin.

13. The laminated film as set forth in claim 2, wherein the adhesive layer comprises 0.01 to 10 mass % of aliphatic amide.

14. The laminated film as set forth in claim 3, wherein the adhesive layer comprises 0.01 to 10 mass % of aliphatic amide.

15. The laminated film as set forth in claim 2, wherein the styrene based elastomer has a styrene content of 30 mass % or more and 60 mass % or less.

16. The laminated film as set forth in claim 3, wherein the styrene based elastomer has a styrene content of 30 mass % or more and 60 mass % or less.

17. The laminated film as set forth in claim 4, wherein the styrene based elastomer has a styrene content of 30 mass % or more and 60 mass % or less.

18. The laminated film as set forth in claim 2, wherein the styrene based elastomer has a styrene content of 50 mass % or more and 60 mass % or less.

19. The laminated film as set forth in claim 3, wherein the styrene based elastomer has a styrene content of 50 mass % or more and 60 mass % or less.

20. The laminated film as set forth in claim 4, wherein the styrene based elastomer has a styrene content of 50 mass % or more and 60 mass % or less.

* * * * *